United States Patent
Dugas

(10) Patent No.: US 8,413,781 B2
(45) Date of Patent: Apr. 9, 2013

(54) POSITIVE LOCKING ROLLER STOP DEVICE

(76) Inventor: Patrick J. Dugas, Winter Haven, FL (US)

( * ) Notice: Subject to any disclaimer, the term of this patent is extended or adjusted under 35 U.S.C. 154(b) by 701 days.

(21) Appl. No.: 12/503,053

(22) Filed: Jul. 14, 2009

(65) Prior Publication Data

US 2011/0011693 A1    Jan. 20, 2011

(51) Int. Cl.
*F16D 41/12* (2006.01)
*F16D 11/14* (2006.01)

(52) U.S. Cl. .................................................. 192/69.1

(58) Field of Classification Search ............ 192/69.1, 192/69.5, 45.001, 45.004, 45.008, 45.01, 192/45.018, 45.019, 45.02, 46, 41 R; 188/82.74
See application file for complete search history.

(56) References Cited

U.S. PATENT DOCUMENTS

| | | | | |
|---|---|---|---|---|
| 1,745,953 A | * | 2/1930 | Rathbun | 192/56.6 |
| 1,951,191 A | * | 3/1934 | Gargan | 192/46 |
| 1,978,416 A | * | 10/1934 | Dodge | 475/267 |
| 2,050,910 A | * | 8/1936 | Zancan | 192/69.5 |
| 2,308,926 A | * | 1/1943 | Kreis | 192/46 |
| 2,762,479 A | * | 9/1956 | Ullery | 192/45 |
| 3,539,044 A | * | 11/1970 | Grimstad | 192/69.5 |
| 4,116,314 A | * | 9/1978 | Ackerman | 192/46 |
| 4,275,805 A | * | 6/1981 | Crankshaw | 192/46 |
| 5,577,407 A | * | 11/1996 | Savkar et al. | 192/46 |
| 6,481,551 B1 | * | 11/2002 | Ruth | 192/46 |
| 7,070,035 B2 | * | 7/2006 | Wians | 192/46 |

* cited by examiner

*Primary Examiner* — David D Le
*Assistant Examiner* — Jacob S Scott

(57) ABSTRACT

A positive locking roller stop device includes two parallel disks; one is attached in a fixed position on a shaft while the other is mounted to same shaft via a bearing, allowing for rotation of this disk independent of the rotation of the shaft. One disk has one or more spring arm rollers attached to surface facing the second disk which has either an inclined notch(es) or inclined ramp(s) positioned to face the other disk and spring arm roller. Spacing between the disks allows the spring arm roller to engage the inclined notch(es) in the other disk when rotated in one direction thereby locking the movable disk to shaft while allowing free rotation of movable disk around shaft when rotated in opposite direction.

5 Claims, 2 Drawing Sheets

POSITIVE LOCKING ROLLER STOP DEVICE

TECHNICAL FIELD

This embodiment relates to a device having a rotational mechanism attached to a shaft that allows rotational motion to be transmitted in one direction at high rotational speeds, but allowing for free-wheeling of a work piece such as a flywheel with minimal friction when the power source is reduced, preventing the slower shaft speed from reducing the speed of the work piece.

BACKGROUND OF THE INVENTION

The most common type of apparatus that operates in a similar way is a ratchet with a gear and pawl. A ratchet typically is used to transmit torque in one direction to a work piece but is not practical for high speed applications. In contrast to the conventional ratchet, this embodiment allows for the transmission of rotational energy at high rotational speeds while allowing free-wheeling with minimal friction, and without hindering the rotation of a work piece such as a flywheel when the energy supplied to the shaft decreases. As energy is supplied to the shaft and the rotational speed increases the roller stop is engaged to add rotation to the work piece. As the energy supplied to the shaft decreases, the positive locking roller stop allows the work piece to continue to rotate unhindered until additional energy again is supplied to the shaft by the power source and the rotational speed of the shaft increases again.

BRIEF DESCRIPTION OF THE DRAWINGS

FIG. 1 and FIG. 3 also show the inclined notch(es) 7 or inclined ramp(s) 9 which are inscribed into or raised above the surface of second disk 5, and engage the spring arm roller(s) 2 attached to first disk 1.

DETAILED DESCRIPTION OF THE PREFERRED EMBODIMENTS

As shown in the figures, the positive locking roller stop device of this embodiment is a very simple device with few moving parts.

Figure 1:
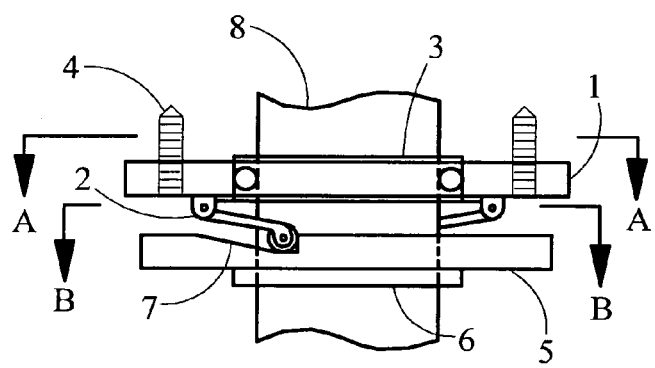
FIG. 1 is a lateral view of the positive locking roller stop device of this embodiment showing a shaft 8 through the center of first disk 1 and second disk 5 with the spring arm roller(s) 2, which are attached to first disk 1, operating on a plane perpendicular to the axis of the shaft 8. First disk 1 is attached to shaft 8 through bearing 3. Fasteners 4 are used for attaching the positive locking roller stop device of this embodiment to a work piece, such as a flywheel.
Figure 2:
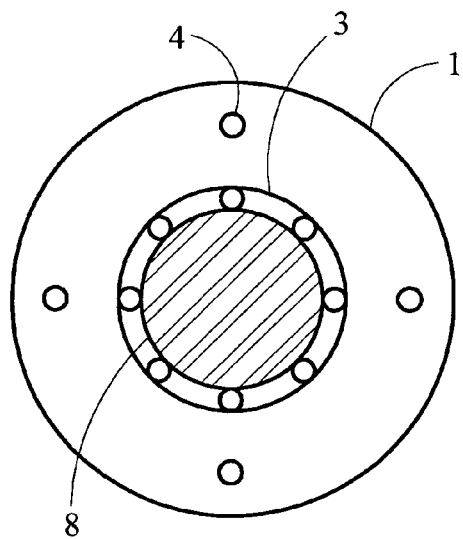
FIG. 2 is a view from parting line A-A and FIG. 3 is a view from parting line B-B of the positive locking roller stop device of this embodiment showing first disk 1 mounted on a bearing 3 allowing rotation independent of the shaft 8, and second disk 5 mounted on the shaft 8 and held in a fixed position by collar 6.
Figure 3:
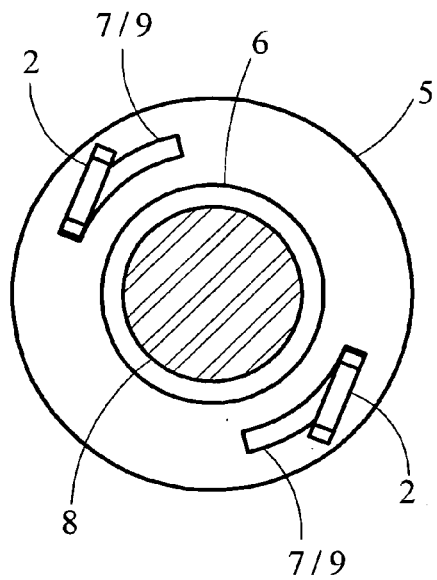

The positive locking roller stop device configuration shown in FIG. 1, FIG. 2 and FIG. 3 is comprised of first disk 1 and second disk 5 of any convenient size and thickness aligned on a shaft 8 with the sufficient space between the two disks to allow the spring arm roller(s) 2 room for proper travel. As shown in FIG. 1, second disk 5, which includes the inclined notch(es) 7 or inclined ramp(s) 9, is attached to shaft 8 in a fixed position by collar 6, so that shaft 8 and second disk 5 rotate together. First disk 1, to which the spring arm roller(s) 2 are attached, is attached to bearing 3 and rotates independently of shaft 8 and second disk 5, if first disk 1's rotation is faster than shaft 8 and second disk 5. The orientation of the first disks 1 and second disk 5 as being attached to shaft 8 in a fixed position or rotating freely on a bearing may be reversed. Fasteners 4 in first disk 1 provide a means of attaching a work piece such as a flywheel.

Figure 4A:
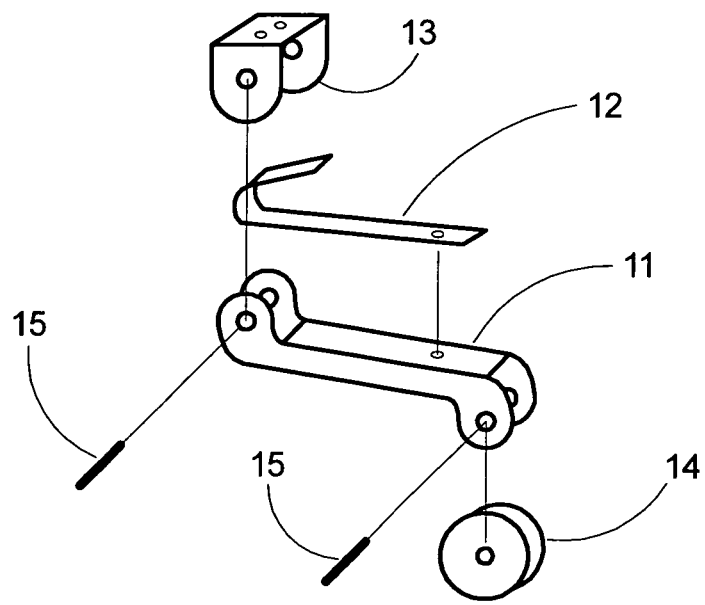
FIG. 4a is a detail of the spring arm roller(s) 2 showing the spring arm 11, spring 12, bracket 13 for attaching the spring arm 11 to the surface of first disk 1, roller 14, and pins 15 for attaching the roller 14 to the roller arm 11 and attaching roller arm 11 to bracket 13 attached to first disk 1.
Figure 4B:
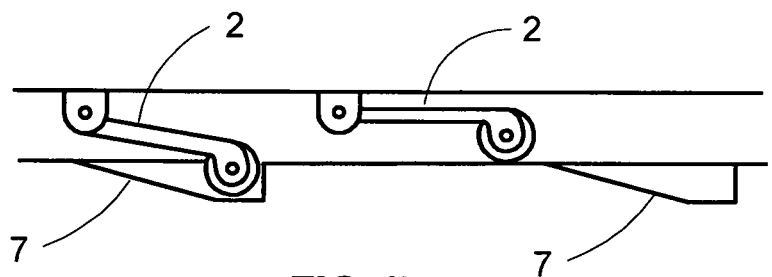
FIG. 4b is a lateral view of the two positions of the spring arm roller(s) 2 with respect to the surfaces of first disk 1, second disk 5 and inclined notch(es) 7 cut in second disk 5.
Figure 4C:
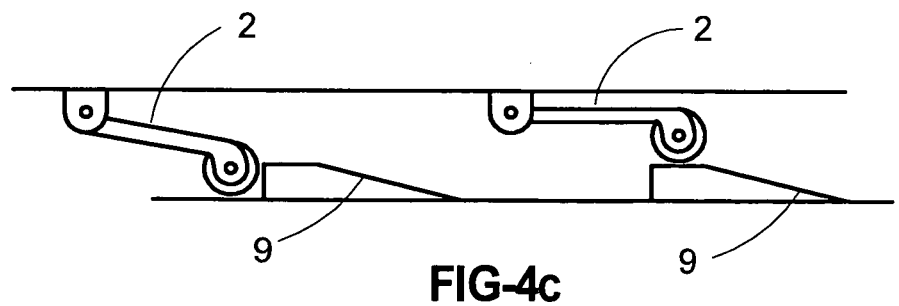
FIG. 4c is a lateral view of the two positions of the spring arm roller(s) 2 with respect to the surfaces of first disk 1, second disk 5, and inclined ramp(s) 9 positioned above the surface of second disk 5, as an alternative to the inclined notch(es) 7 shown in FIG. 4b.

The size, configuration and number of spring arm roller(s) 2 used can vary. The orientation of the spring arm roller(s) 2 on first disk 1 and the inclined notch(es) 7 or inclined ramp(s) 9 on second disk 5 to the axis of shaft 8 also may vary from a plane perpendicular to the axis of shaft 8 as shown in FIG. 1 to a plane parallel to the axis of shaft 8. The spring arm roller(s) 2 is comprised of the arm 11, spring 12, bracket 13, roller 14 and pins 15 as shown in FIG. 4a.

When the rotational speed of shaft 8 and second disk 5 is equal to that of first disk 1, the inclined notch(es) 7 cut in second disk 5 or inclined ramp(s) 9 positioned above the surface of second disk 5, engage with the spring arm roller(s) 2 attached to first disk 1, and the rotational speed of first disk 1 remains the same as shaft 8 and second disk 5. When the rotational speed of shaft 8 and second disk 5 decreases, the spring arm roller(s) 2 attached to first disk 1 roll freely over second disk 5 unaffected by the slowing of shaft 8 and second disk 5.

What is claimed is:

1. A positive locking roller stop device comprising:
a first disk mounted on a shaft, wherein the first disk rotates relative to the shaft via a bearing;
a second disk fixed to the shaft in a position parallel to the first disk;
one or more spring arm rollers including an arm pivotally coupled to one of the first disk and the second disk and a roller attached to the arm, wherein the arm is biased axially towards the other of the first disk and the second disk so that the roller contacts one of an inclined ramp or an inclined notch integrated with the other of the first disk and the second disk, wherein in a first direction the roller permits freewheeling rotation of the first disk and second disk relative to the other and in a second direction the roller positively engages a portion of the inclined ramp or the inclined notch to transmit rotational energy and prohibit rotational motion of the first disk relative to the second disk.

2. The device of claim 1, wherein the inclined ramp is attached to a surface of the first disk or the second disk which faces the other of the first disk and second disk.

3. The device of claim 1, wherein the inclined notch is cut into the surface of the first disk or the second disk which faces the other of the first disk and second disk.

4. The device of claim 1, wherein the second disk is fixed to the shaft via a collar.

5. A positive locking roller stop device comprising:
a first disk mounted on a shaft, wherein the first disk rotates relative to the shaft via a bearing;
a second disk fixed to the shaft in a position parallel to the first disk;

means for transmitting rotational energy between the first disk and the second disk in a first direction and enabling freewheeling rotation of the first disk relative to the second disk in a second direction.

* * * * *